United States Patent
Poldmaa et al.

(10) Patent No.: US 10,617,898 B2
(45) Date of Patent: Apr. 14, 2020

(54) ANCHOR

(71) Applicant: Safetylink Pty Ltd, Hawks Nest, NSW (AU)

(72) Inventors: Arvo Poldmaa, Hawks Nest (AU); Daniel Poldmaa, Hawks Nest (AU)

(73) Assignee: Safetylink Pty Ltd, Hawks Nest, NSW (AU)

( * ) Notice: Subject to any disclaimer, the term of this patent is extended or adjusted under 35 U.S.C. 154(b) by 0 days.

(21) Appl. No.: 15/571,226

(22) PCT Filed: Apr. 28, 2016

(86) PCT No.: PCT/AU2016/050299
§ 371 (c)(1),
(2) Date: Nov. 1, 2017

(87) PCT Pub. No.: WO2016/176721
PCT Pub. Date: Nov. 10, 2016

(65) Prior Publication Data
US 2018/0264297 A1    Sep. 20, 2018

(30) Foreign Application Priority Data

May 5, 2015 (AU) .................. 2015901598

(51) Int. Cl.
*A62B 35/04* (2006.01)
*A62B 35/00* (2006.01)
(Continued)

(52) U.S. Cl.
CPC .......... *A62B 35/04* (2013.01); *A62B 35/0056* (2013.01); *A62B 35/0068* (2013.01);
(Continued)

(58) Field of Classification Search
USPC ........ 248/560, 562, 566, 617; 52/24, 25, 26, 52/27, 749.12, 698, 167.1, 712, 714,
(Continued)

(56) References Cited

U.S. PATENT DOCUMENTS 3,812,535 A * 5/1974 Higgins .................. G11B 5/60
360/244.2
5,113,981 A * 5/1992 Lantz ...................... F16F 7/006
182/3

(Continued)

FOREIGN PATENT DOCUMENTS

AU    2008100070 A4    2/2008
AU    2013100441 A4    5/2013

(Continued)

OTHER PUBLICATIONS

International Searching Authority, International Search Report and Written Opinion for International Application No. PCT/AU2016/050299, dated Jun. 14, 2016, Australian Patent Office, Australia.

(Continued)

*Primary Examiner* — Terrell L McKinnon
*Assistant Examiner* — Michael McDuffie
(74) *Attorney, Agent, or Firm* — Alston & Bird LLP

(57) ABSTRACT

The present invention is directed to an anchor for anchoring to an elevated worksite. The anchor includes a shock absorbing portion configured to progressively distort under sudden loading, the shock absorbing portion having one or more serpentine shaped members each defining one or more serpentine shaped curves visible from a front view of the shock absorbing portion, the shock absorbing portion having a curved profile defining one or more curves visible from a side view of the shock absorbing portion. The curved profile is configured to progressively distort under sudden loading so as to provide a first level of shock absorption, and the (Continued)

serpentine shaped curves are configured to progressively distort under sudden loading to provide a second level of shock absorption.

12 Claims, 14 Drawing Sheets

(51) Int. Cl.
   *F16F 7/00* (2006.01)
   *F16F 7/12* (2006.01)
(52) U.S. Cl.
   CPC .............. *F16F 7/003* (2013.01); *F16F 7/128* (2013.01); *F16F 2224/0208* (2013.01); *F16F 2226/047* (2013.01)
(58) Field of Classification Search
   USPC ........................................ 52/167.7; 182/3, 6
   See application file for complete search history.

(56) References Cited

U.S. PATENT DOCUMENTS

| | | | | |
|---|---|---|---|---|
| 6,085,802 | A * | 7/2000 | Silberberg | A62B 35/04 139/387 R |
| 6,098,746 | A * | 8/2000 | Castaneda | A62B 35/0043 182/45 |
| 6,312,057 | B1 * | 11/2001 | Feile | B60R 22/28 280/805 |
| 6,533,066 | B1 * | 3/2003 | O'Dell | A62B 35/04 182/3 |
| 7,073,627 | B2 * | 7/2006 | Casebolt | A62B 35/0031 119/770 |
| 7,665,248 | B2 * | 2/2010 | Blackford | E04D 13/12 52/27 |
| 9,227,094 | B2 * | 1/2016 | Poldmaa | E04G 21/328 |
| 9,233,585 | B1 * | 1/2016 | Haynes | B60D 1/18 |
| 9,316,008 | B2 * | 4/2016 | Poldmaa | A62B 1/04 |
| 9,566,458 | B2 * | 2/2017 | Duvekot | A62B 1/04 |
| 2009/0133977 | A1 * | 5/2009 | Warren | A62B 35/04 188/371 |
| 2013/0056608 | A1 * | 3/2013 | Poldmaa | A62B 35/04 248/560 |
| 2013/0168528 | A1 * | 7/2013 | Patton | A62B 35/0068 248/548 |
| 2013/0277519 | A1 | 10/2013 | Poldmaa | |
| 2014/0346314 | A1 | 11/2014 | Poldmaa | |

FOREIGN PATENT DOCUMENTS

| | | |
|---|---|---|
| CH | 704527 A1 | 8/2012 |
| FR | 2857601 A1 | 1/2005 |
| GB | 964096 | 12/1960 |
| WO | WO-2010/000035 A1 | 1/2010 |

OTHER PUBLICATIONS

European Patent Office, Extended European Search Report for European Patent Application No. 16788947.6, dated Jan. 3, 2019, (9 pages), Germany.

* cited by examiner

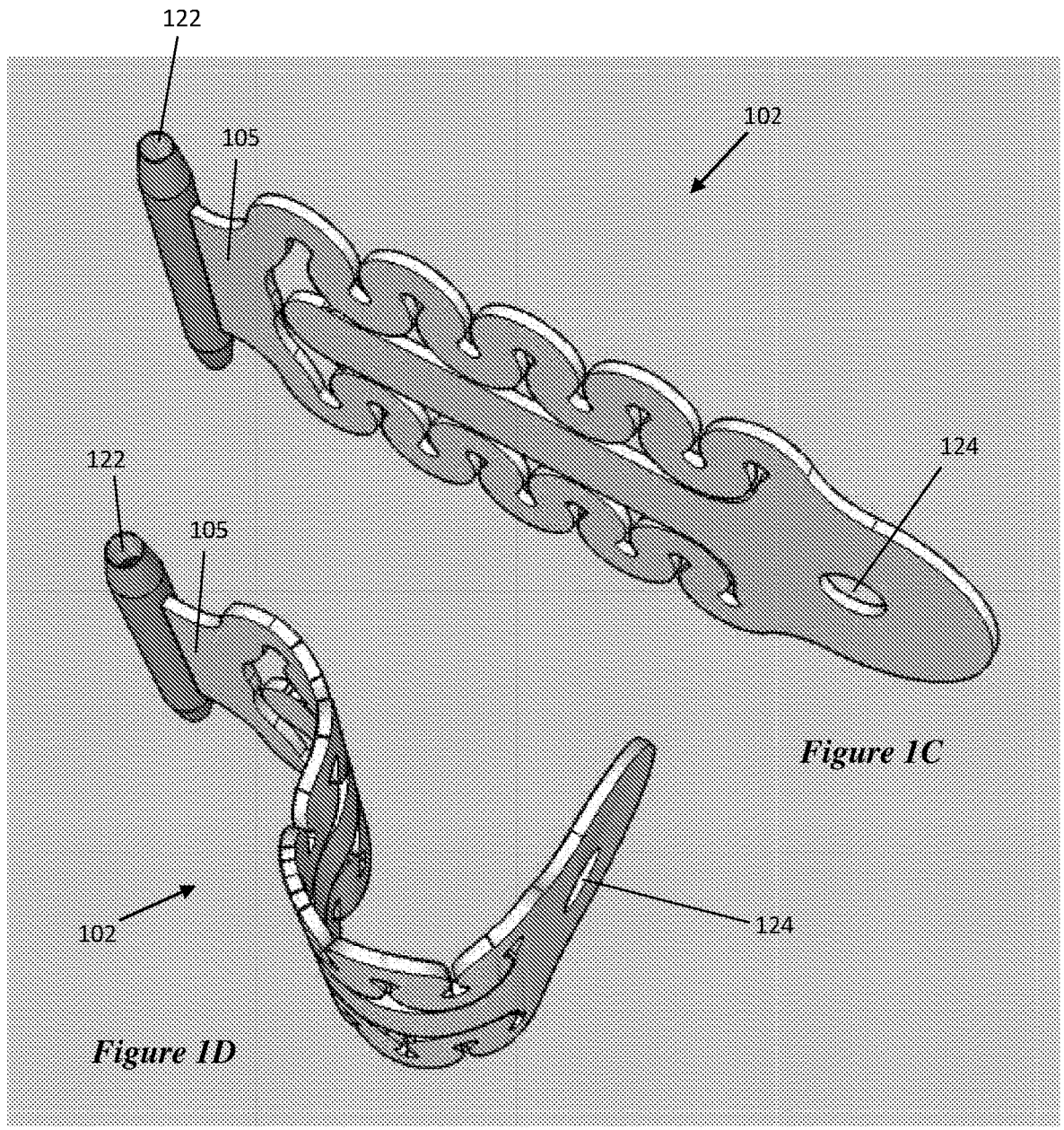

ANCHOR

CROSS REFERENCE TO RELATED APPLICATIONS

This application is a National Stage Application, filed under 35 U.S.C. 371, of International Application No. PCT/AU2016/050299, filed Apr. 28, 2016, which claims priority to Australian Application No. 2015901598, filed May 5, 2015; the contents of both of which as are hereby incorporated by reference in their entirety.

BACKGROUND

Related Field

The present invention relates to an anchor for anchoring to an elevated worksite such as a roof or a ledge. More specifically, the anchor can be used as a part of an anchoring system, such as a static line system, for connecting to a worker via a safety harness.

Description of Related Art

The following references to and descriptions of prior proposals or products are not intended to be, and are not to be construed as, statements or admissions of common general knowledge in the art. In particular, the following prior art discussion does not relate to what is commonly or m well known by the person skilled in the art, but assists in the understanding of the inventive step of the present invention of which the identification of pertinent prior art proposals is but one part.

In industries such as the construction industry, it is often necessary for workers to be working at heights. For example, on roofs, ledges, scaffolds, ladders and mezzanine floors. Worker safety is an important consideration as falls from height can leave workers with permanent and debilitating injuries.

Various height safety equipment exist to mitigate these risks for workers working from heights. For example, a static line system can be used on a roof to protect a worker from serious injury in the event of a falling incident. The static line system typically includes a number of anchors secured to the roof, and a cable secured to the anchors. A cord attached to a harness worn by a worker can be linked to the cable via a shuttle. The static line system therefore provides a means to prevent the worker from hitting the ground in the event of a fall. At the same time, the system provides the worker with sufficient mobility to move around the worksite.

When a worker falls from a height, the dynamic load on the static line system and the worker can be significant. The dynamic load also varies greatly depending on the location from which the worker falls as well as the direction of the fall. For example, a worker falling from a height above the static line system to a position below the static line system will create a greater dynamic force on the system and the worker than a worker falling from a position level with or below the static line system. These significant impact forces may cause injury to the fallen worker, such as bruising or spraining, even if the worker does not hit the ground. The impact also creates stresses and strains in the static line system causing it to weaken over time. The components of the system therefore require periodic testing, maintenance and replacement.

To reduce the impact, some static line systems include a shock absorber attached to one or more of the anchors in the system. The shock absorber allows for a degree of flex in the cable so as to absorb a level of shock from the impact of a fall.

Embodiments of the present invention provide an improved anchor and static line system for an elevated work site, which overcomes or ameliorates one or more of the disadvantages or problems described above, or which at least provides the consumer with a useful choice.

BRIEF SUMMARY

According to one aspect of the invention, there is provided an anchor for anchoring to an elevated worksite, the anchor including a shock absorbing portion configured to progressively distort under sudden loading, the shock absorbing portion having one or more serpentine shaped members each defining one or more serpentine shaped curves visible from a front view of the shock absorbing portion, the shock absorbing portion having a curved profile defining one or more curves visible from a side view of the shock absorbing portion, wherein the curved profile is configured to progressively distort under sudden loading so as to provide a first level of shock absorption, and the serpentine shaped curves are configured to progressively distort under sudden loading to provide a second level of shock absorption.

Advantageously, the serpentine shaped members and the curved profile increases the energy absorption capabilities of the shock absorbing portion. In the event of a sudden loading, the curved profile allows at least a portion of the shock absorbing portion to extend and/or deform a certain amount in the direction of the load. The serpentine shaped members allow further extension of the shock absorbing portion to further dissipate and absorb the energy in the direction of the load if required. The anchor of the present invention thereby provides at least two levels of shock absorption to reduce the impact on the fallen worker, the anchor and the structure to which the anchor is mounted.

The shock absorbing portion can have any suitable number of serpentine shaped portions. The serpentine shaped portions may include regular shaped curves in a repeated pattern, or irregular shaped curves and bends of any suitable shape, orientation and size. In one embodiment, the shock absorbing portion may have two serpentine shaped members. In another embodiment, the shock absorbing portion may have three serpentine shaped members.

The curved profile can define any suitable number of bends in any suitable curvature. The curved profile may define a generally S-shaped profile. Alternatively, the curved profile may define a generally C-shaped profile, or any irregular curved profile.

The shock absorbing portion may include one or more frangible joints for connecting one or more serpentine shaped members to one or more support members. The support members may form part of the shock absorbing portion. One serpentine shaped member may be connected to a support member via one or more frangible joints. Alternatively, a pair of serpentine shaped members may be connected to a common support member. The pair of serpentine shaped members may be mirrored in shape and connected to a support member provided between the serpentine members via one or more frangible joints.

The support members may be of any suitable shape or size. For example, the support members may be elongate, generally rectangular, triangular, circular, irregular shaped, or any combination thereof.

Advantageously, the frangible joints are configured to break apart when the anchor becomes subject to a sudden load, allowing the serpentine shaped members to separate from the support members and become extended to absorb the impact from the load.

The shock absorbing portion can be made from any suitable material of any shape and size. Typically, the shock absorbing portion is made from sheet metal. The sheet metal may be of any suitable thickness. In one embodiment, the shock absorbing portion has a constant thickness. For example, the shock absorbing portion may have a thickness of roughly 2 mm to 6 mm. More specifically, the shock absorbing portion may have a thickness of roughly 3 mm. In another embodiment, the shock absorbing portion may have a thickness of roughly 5 mm.

The anchor may further include a base mount for mounting to a supporting structure of the elevated worksite. The base mount can be configured for mounting to a variety of different structures. For example, the base mount may be configured for mounting to concrete, steel purlins, steel beams, roof sheeting/cladding, timber rafters or any combination thereof.

Typically, the base mount may include a mounting plate for mounting to roof sheeting. The base mount may include any suitable combination of bolts, nuts, washers, inserts, plates, sleeves and the like to facilitate mounting of the base mount to a particular material/structure.

The shock absorbing portion may be integrally formed or attached to at least a portion of the base mount.

The anchor may further include a line mount for receiving a safety line. The line mount may include any suitable fastening means for fastening to the safety line. For example, the line mount may include clamps, clips, ringlets and the like for fastening to a safety line. Typically, the line mount includes a sleeve for receiving the safety line therein.

The safety line may include a cable, rope, chain, webbing or the like, secured to a support structure of the elevated worksite via one or more anchors as described above. One or more workers wearing a harness can be attached to the safety line via movable connecting shuttle. Preferably, the connecting shuttle can move along the safety line to thereby provide a degree of mobility to the worker.

According to another aspect of the invention, there is provided an anchoring system for anchoring to an elevated worksite, the anchoring system including at least two anchors, each anchor including a shock absorbing portion configured to progressively distort under sudden loading, the shock absorbing portion having one or more serpentine shaped members each defining one or more serpentine shaped curves visible from a front view of the shock absorbing portion, the shock absorbing portion having a curved profile defining one or more curves visible from a side view of the shock absorbing portion, wherein the curved profile is configured to progressively distort under sudden loading so as to provide a first level of shock absorption, and the serpentine shaped curves are configured to progressively distort under sudden loading to provide a second level of shock absorption; and a safety line for connecting the at least two anchors.

One or more of the anchors may be an anchor as previously described above. In particular, each anchor may include a sleeve for receiving the safety line therein.

The anchoring system may include an end anchor for receiving an end portion, or a portion proximate an end portion of the safety line. The anchoring system may further include an intermediate anchor for receiving an intermediate portion of the safety line. The anchoring system may further include a corner anchor for receiving a corner portion of the safety line.

The end anchor may include a shock absorbing portion having a pair of serpentine members. The pair of serpentine members may be attached to a central support tongue via one or more frangible joints. Typically, each serpentine member of the end anchor is attached to the central support tongue via a single frangible joint. The profile of the shock absorbing portion of the end anchor may define a substantially S-shaped curve.

The end anchor may include a sleeve for receiving an end portion of the safety line, and a fastener for fastening the sleeve to the shock absorbing portion. Any suitable fastener may be used, for example, clamps, clips, nuts, bolts, rivets and the like, or any combination thereof.

The intermediate anchor may include a shock absorbing portion having a pair of serpentine members. The pair of serpentine members may be attached to a central support tongue via one or more frangible joints. Typically, each serpentine member of the intermediate anchor is attached to the central support tongue via a single frangible joint.

The intermediate anchor may include a sleeve for receiving an intermediate portion of the safety line. The sleeve may have two open ends so as to allow the safety line to be received therethrough.

The corner anchor may include a shock absorbing portion having two or more serpentine members. In one embodiment, the corner anchor includes three serpentine members. Two of the serpentine members may each be attached to a lateral support member via one or more frangible joints. Typically, each of the two serpentine members of the corner anchor is attached to a lateral support member via a single frangible joint.

The corner anchor may include a curved sleeve for receiving a corner portion of the safety line. The sleeve may have two open ends so as to allow the safety line to be received therethrough.

The anchor system may further include a shuttle for connecting to and moving along the safety line. The shuttle may allow attachment of a link thereto so as to allow a worker attached to the link to the secured to the safety line and the anchor system.

The anchoring system therefore advantageously ensures the safety of a worker on an elevated site in the event of a fall. The shock absorbing portion of each anchor avoids the need for a separate shock absorbing component in the anchoring system. In conventional systems, the shock absorbing component is typically secured to one or both end anchors only. In these conventional set ups, the system would solely rely on one or two discrete shock absorbers to dissipate the energy from a dynamic load in a fall.

The system of the present invention provides each anchor with shock absorbing capabilities to gradually absorb and dissipate energy from a sudden load in a more effective manner. The progressive distortion of each shock absorbing portion of each anchor also reduces the forces acting on a fallen worker to thereby minimize injury from the fall. In particular, the improved shock absorbing capabilities of the anchoring system enables a reduction of the stresses and strains of a harness acting on a worker during a fall, thereby reducing the likelihood of any serious bruising or sprains.

Typically in traditional static line systems, the number of shock absorbers which must be included in the system is calculated based on the nominal load and the length/size of the safety m line. These manual calculations and manual implementation of the calculated set up can be prone to human error, which can undesirably lead to fatal accidents. The system of the present invention advantageously provides each anchor with shock absorbing capabilities, thereby mitigating the risk of placing the incorrect number of shock absorbers in the system.

The configuration of the shock absorbing portion also prevents forces from a sudden load to be concentrated at a single point of an anchor, such as in conventional anchor designs, which can undesirably cause sudden failure at the single point of the anchor without warning.

According to another aspect of the invention, there is provided a shock absorber configured to progressively distort under sudden loading, the shock absorbing portion having one or more serpentine shaped members each defining one or more serpentine shaped curves visible from a front view of the shock absorbing portion, the shock absorbing portion having a curved profile defining one or more curves visible from a side view of the shock absorbing portion, wherein the curved profile is configured to progressively distort under sudden loading so as to provide a first level of shock absorption, and the serpentine shaped curves are configured to progressively distort under sudden loading to provide a second level of shock absorption.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristic described herein may be combined in any suitable manner in one or more combinations.

BRIEF DESCRIPTION OF THE FIGURES

The preferred embodiment of the present invention will now be described, by way of example, with reference to the accompanying drawings in which:

FIGS. 1C and 1D illustrates a portion of the anchor as shown in FIGS. 1A and 1B before and after forming;

DETAILED DESCRIPTION OF VARIOUS EMBODIMENTS

Figure 1A:
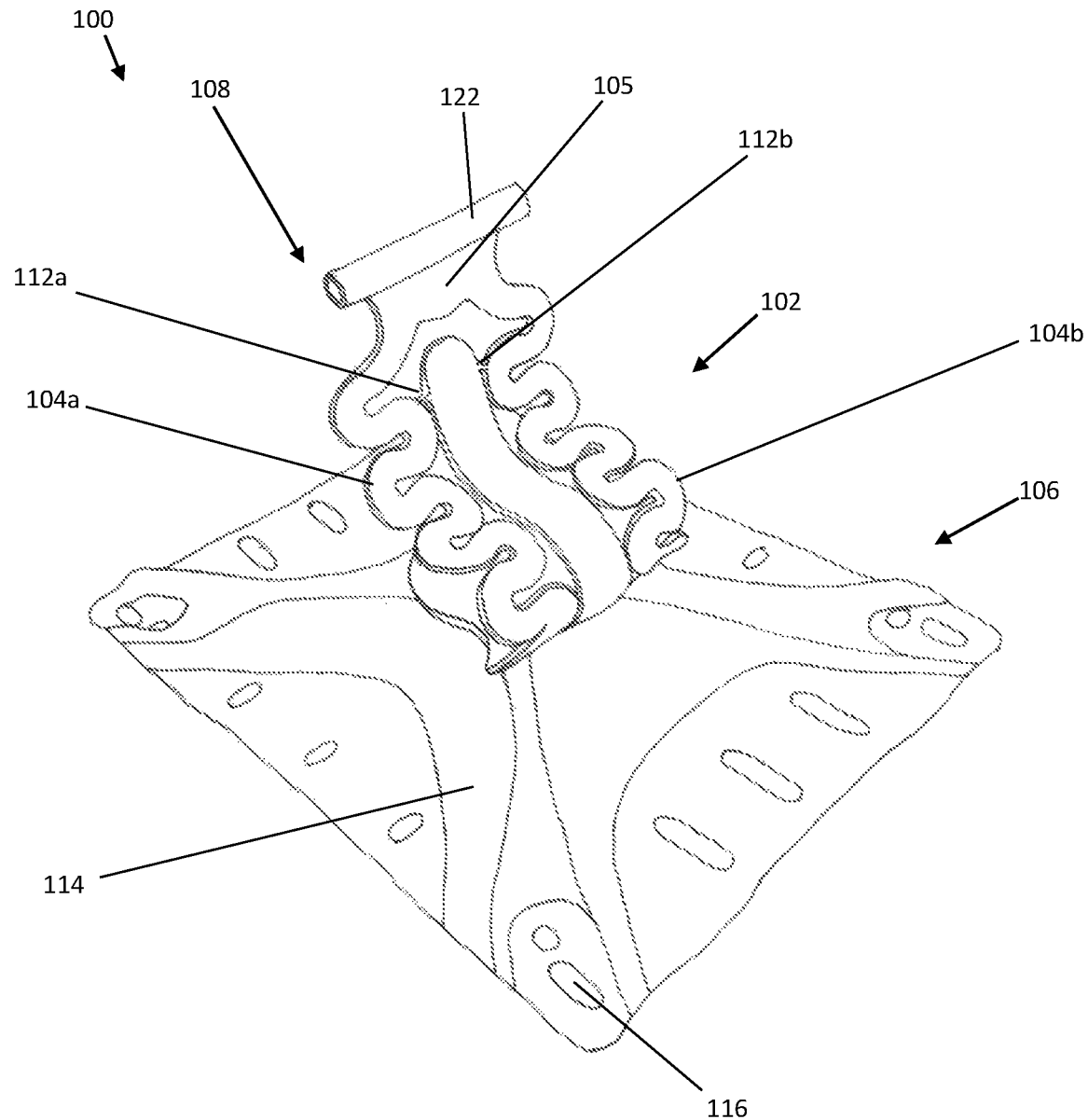
FIGS. 1A and 1B are perspective views of an anchor according one embodiment of the present invention.
Figure 1B:
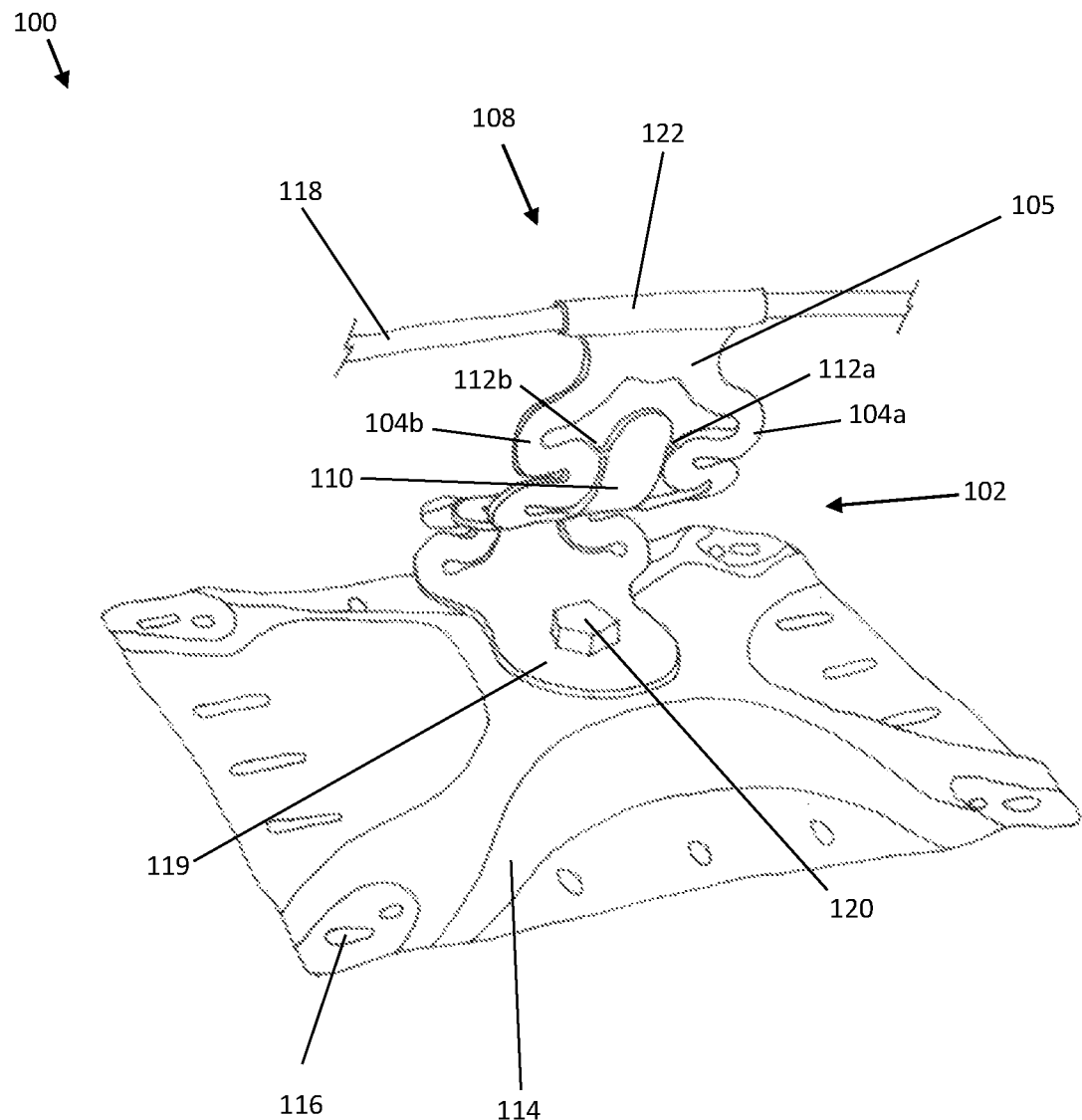

FIGS. 1A and 1B illustrates an anchor 100 for anchoring to an elevated worksite such as a roof. The anchor 100 includes a shock absorbing portion 102 preferably formed from sheet metal (preferably stainless steel, die cut), a base mount 106 for mounting the roof, and a line mount 108 for mounting to a safety line 118 (FIG. 1B). The safety line 118 is ultimately connected to the worker.

The shock absorbing portion 102 is configured to progressively distort under sudden loading (explained in further detail below and with reference to FIG. 4E). The shock absorbing portion 102 includes a pair of serpentine shaped members 104a, 104b each defining serpentine shaped curves visible from a front view (and also visible from a rear view). In the embodiment shown, the pair of serpentine shaped members 104a, 104b are shaped to be a mirror image of one another about a centre line running longitudinally through a middle of the central support member, and terminate at a bridging portion 105. The bridging portion 105 connects an upper end of each of the serpentine shaped members 104a, 104b to each other and to the line mount 108. In the embodiments described herein, the front view is defined to be the view facing the wider side of the shock absorbing portion 102.

The pair of serpentine shaped members 104a, 104b are connected to a central support member (or support tongue) 110 via respective frangible joints 112a, 112b. The frangible joints 112a, 112b prevent the serpentine members 104a, 104b from deforming too early or unnecessarily. A further advantage of the frangible joints 112a, 112b is that broken joints indicates a fall has taken place and the relevant anchor(s) 100 requires replacement.

When viewed from a side (FIG. 1D), it can be seen that the shock absorbing portion 102 has a curved profile. In the embodiments described herein, the side view is defined to be the view facing the narrower side of the shock absorbing portion 102, rotated 90° from the front view. The curved profile defines a near S-shaped curve having a generally straightened upper portion.

The base mount 106 includes a base plate 114 defining a plurality of openings 116 to facilitate mounting to a roof, for example by mounting to roof profiles of roof cladding. In particular, the positioning of the openings 116 about the periphery of the base plate 114 is designed to enable alignment with standardised roof profiles.

As more clearly seen in FIG. 1B, the shock absorbing portion 102 includes a base 119 defining an opening 124 (FIGS. 1C and 1D) for attachment to the base plate 114 via a bolt 120. The line mount 108 includes a sleeve 122 having two open ends for receiving the safety line 118 therethrough.

In use, a worker is connected to the anchor 100 either directly or indirectly via the safety line 118. In the event of an unexpected fall, forces from the fall are applied to the anchor as a sudden dynamic load. The anchor 100 is designed to progressively deform to dissipate energy from the load in a controlled manner. In particular, the curved profile allows the shock absorbing portion 102 to extend in the direction of the load upon breaking of the frangible joints 112a, 112b. When the sudden load exceeds a certain amount, the serpentine shaped members 104a, 104b can further extend to in the direction of the load to further dissipate energy from the fall as required. This will be explained in further detail with respect to FIG. 4E.

Now referring to FIGS. 1C and 1D, the shock absorbing portion 102 can be initially formed from a single sheet of metal as shown in FIG. 1C. The bridging portion 105 is then welded to the sleeve 112 for attachment thereto. The shock absorbing portion 102 is then deformed to create a curved profile as shown in FIG. 1D. In an alternative embodiment, the curved profile of the shock absorbing portion 102 may be formed prior to attachment of the sleeve 112. In another embodiment, the entire component (including the shock absorbing portion 102 and the m sleeve 112) as shown in FIGS. 1C and 1D is manufactured using forging or casting processes. It will be appreciated that the bridging portion 105 is an optional feature and in a further embodiment (not shown), the sleeve 112 is welded or otherwise attached directly to the shock absorbing portion 102.

Figure 2A:
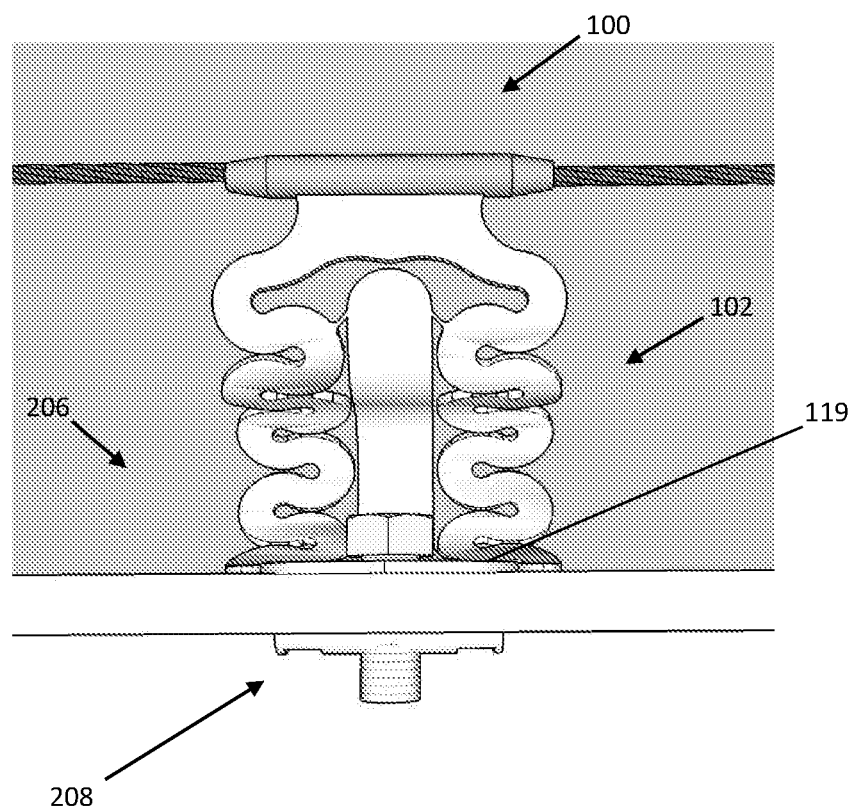
FIGS. 2A and 2B illustrate the portion of the anchor shown in FIG. 1D used with different base mount assemblies for mounting to different structures and materials.

As shown in FIG. 2A, in another embodiment, the anchor 100 has a different base mount assembly 206 configured for mounting to an underlying support structure of a roof (also referred to as a purlin). Purlins are often positioned beneath roof sheeting to provide structural support. When working on roofs having purlins, the anchor 100 can be mounted directly to the purlins through the roof sheeting using a combination of bolts, washers, cables and tubes.

Figure 2B:
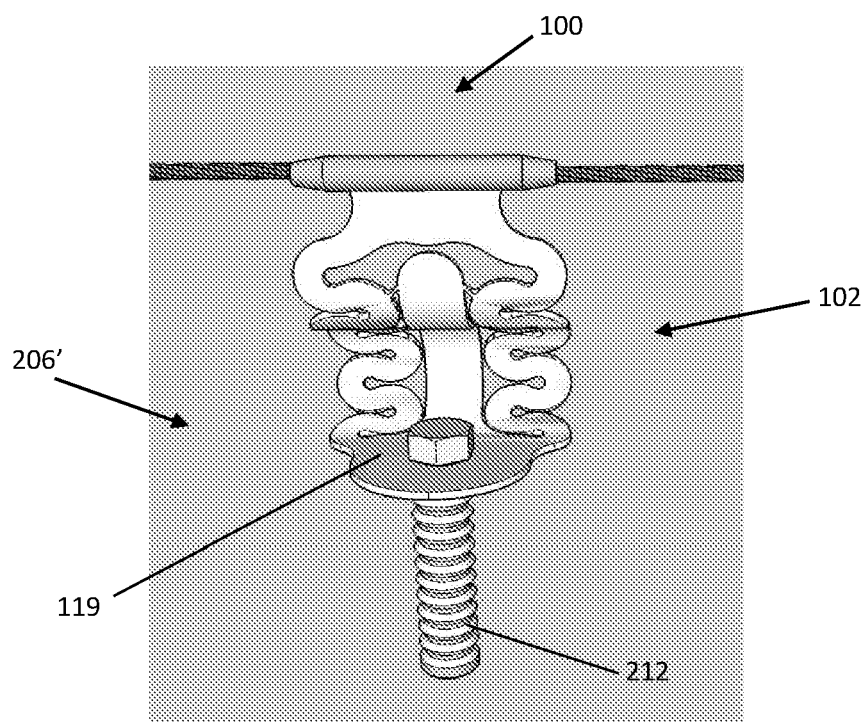

In a further embodiment, as shown in FIG. 2B, the anchor 100 includes a base mount assembly 206' configured for mounting to a concrete structure. In particular, the base 119 can be directly mounted to the concrete via a bolt 212.

Whilst the above provides an example of the types of base mount assemblies which can be used, other base mount assemblies can also be used for mounting the anchor 100 to any structure including steel beams, timber rafters and the like.

The concept of the anchor 100 having serpentine portions 104a, 104b and a curved profile can be applied to various other specific anchor configurations as explained in further detail below.

Figure 3A:
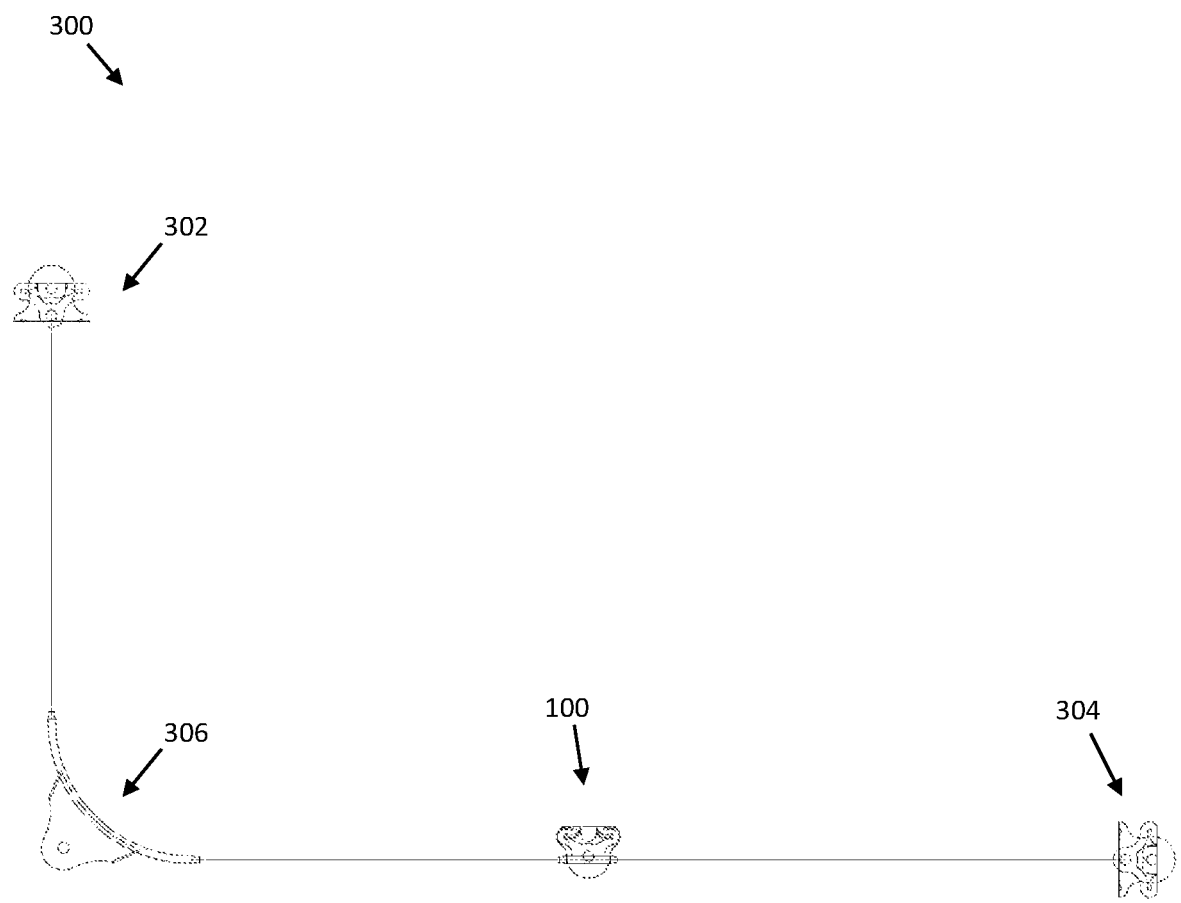
FIGS. 3A to 3D illustrate an anchoring system according an embodiment of the present invention.
Figure 3B:
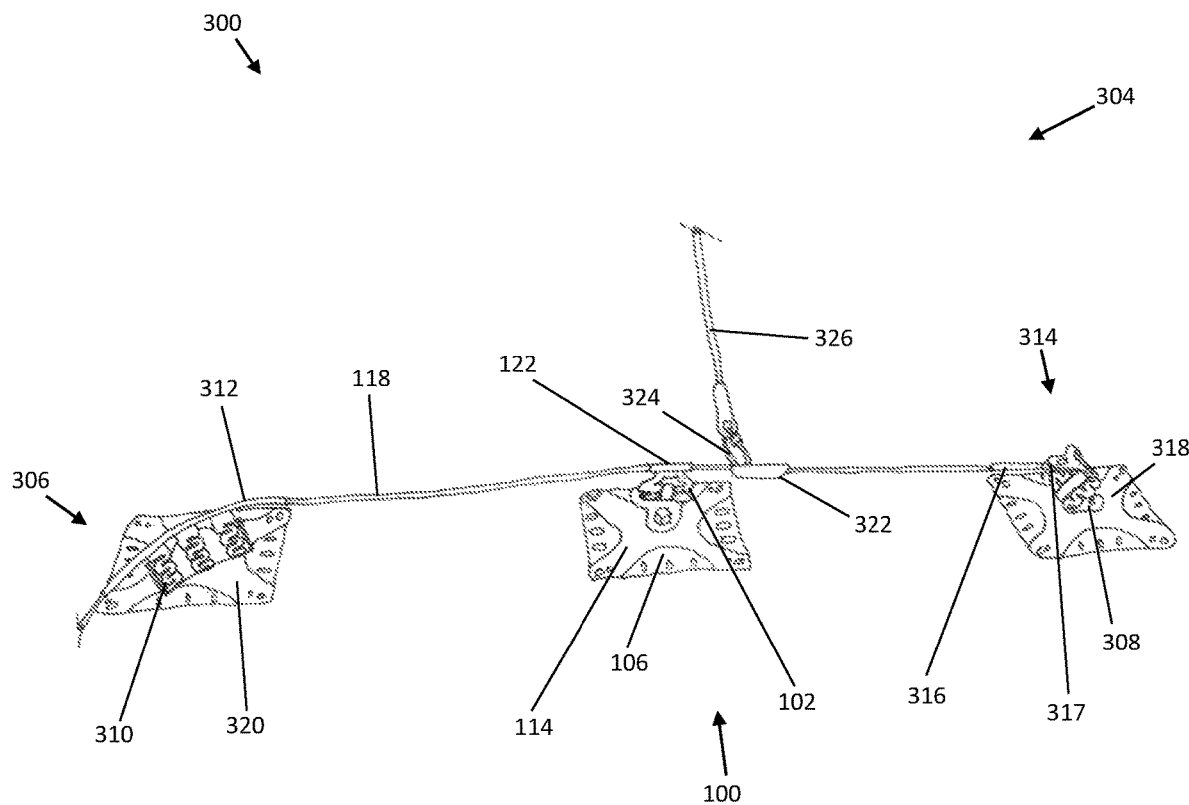
Figure 3C:
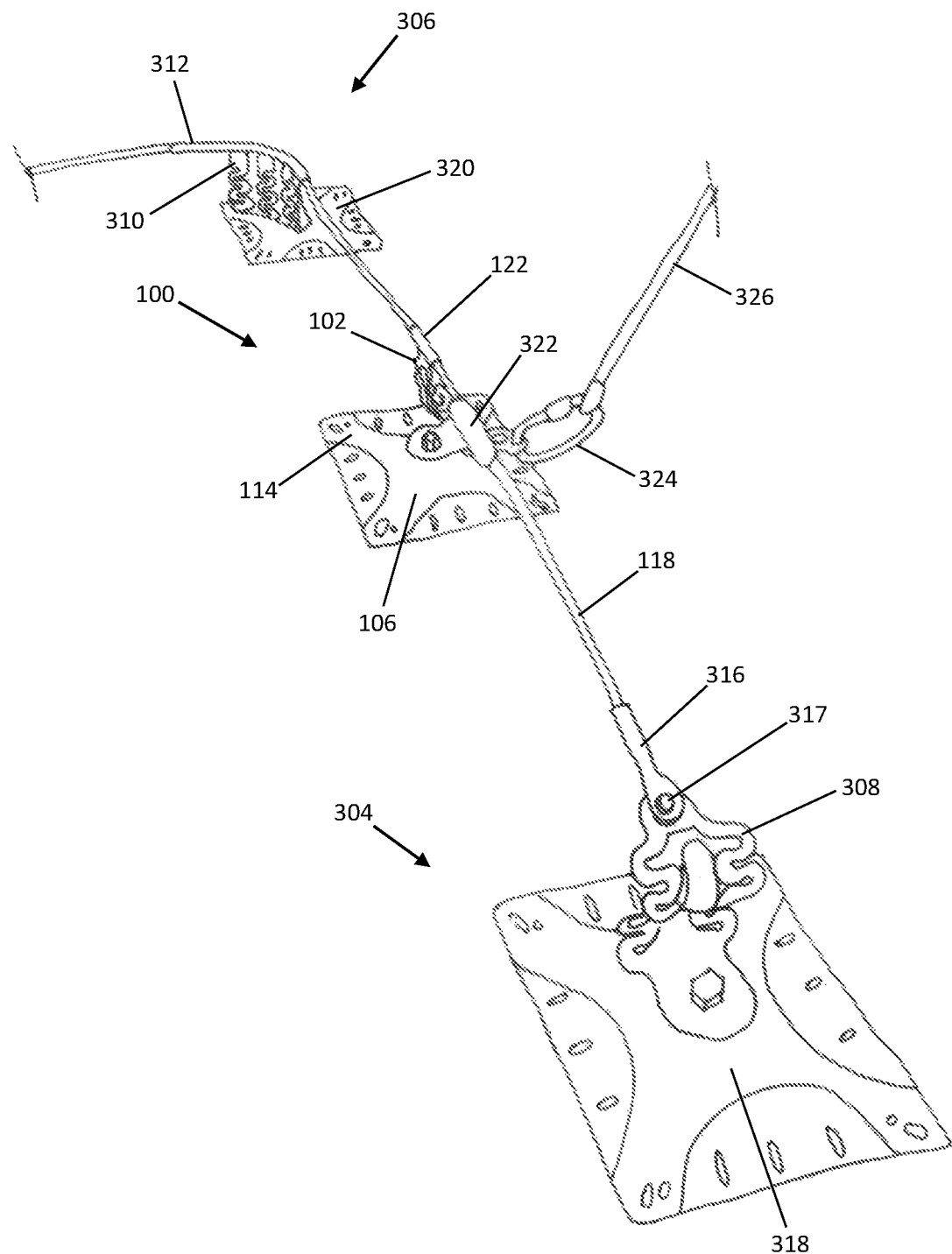
Figure 3D:
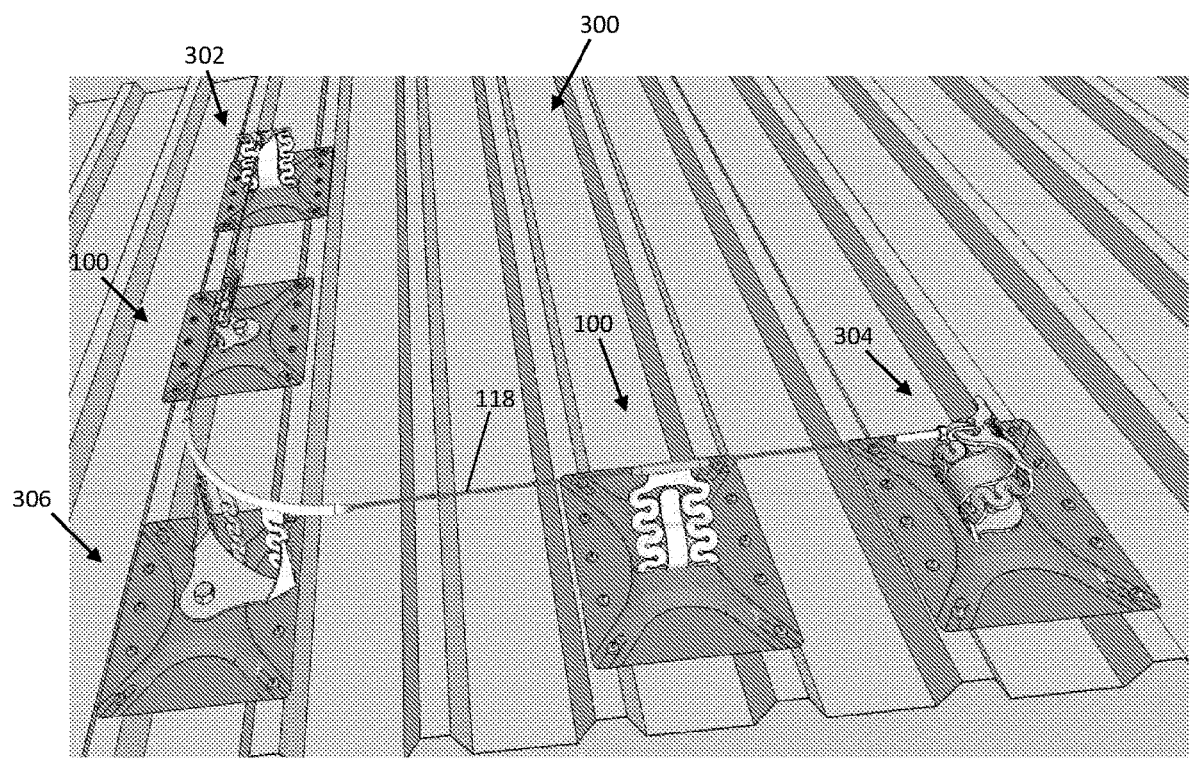

FIGS. 3A to 3C illustrate an anchoring system 300 including two end anchors 302, 304, an intermediate anchor 100 configured as described above in relation to FIGS. 1A to 1D, and a corner anchor 306. FIG. 3D illustrates an anchoring system 300 having two intermediate anchors 100. A safety line 118 is secured to each of the anchors 302, 304, 100, 306 to provide a static line assembly. In particular, end anchors 302, 304 are configured to receive opposite ends of the safety line 118, the intermediate anchor 100 receives an intermediate portion of the safety line 118 between the two opposite ends, and the corner anchor 306 receives a bent corner portion of the safety line 118.

Each of the anchors 302, 304, 100, 306 can be secured to any elevated worksite, such as a roof, ridge, beam and the like. The specific example provided herein relates to an anchoring system 300 secured to roof profiles/cladding.

As more clearly shown in FIGS. 3B and 3C, each anchor 304, 100, 306 respectively includes a shock absorbing portion 308, 102, 310, a base mount 318, 106, 320 for mounting to the roof, and a line mount 314, 122, 312 for securing the safety line 118. The configuration of the end anchors 302, 304 is the same.

Each base mount 318, 106, 320 includes a base plate configured in a similar manner to base plate 114 as described above with reference to FIGS. 1A and 1B.

Each line mount includes a sleeve 316, 122, 312 for receiving a portion of the safety line 118. In addition, the end anchor 304 includes a clamp 317 for securing the end of the safety line 118 to the end anchor 304. The sleeve 312 of the corner anchor 306 is curved to accommodate for a curve in the safety line 118.

The anchoring system 300 further includes a shuttle 322 attached to and movable along the safety line 118, and a link in the form of a rope 326 attached to the shuttle 322 via a carabiner 324. The rope 326 is attached to the worker's safety harness (not shown)

The configuration of the end anchor 302, 304 and corner anchor 306 will now be described with reference to FIGS. 4A to 6.

FIGS. 4A to 4D illustrate the shock absorbing portion 308 of the end anchor 302. The shock absorbing portion 308 of the end anchor 302 is similar to the shock absorbing portion 102 of the intermediate anchor 100. The portion 308 includes a pair of serpentine shaped members 404a, 404b each defining serpentine shaped curves visible from a front view. The pair of serpentine shaped members 404a, 404b start from a base 419 and terminate at a bridging portion 405. The base 419 defines an opening 424 for attachment to a base plate 315 (FIG. 4E). The bridging portion 405 connects an upper end of each of the serpentine shaped members 404a, 404b to each other and defines an opening 403 for connection to the line mount 314.

Figure 4A:
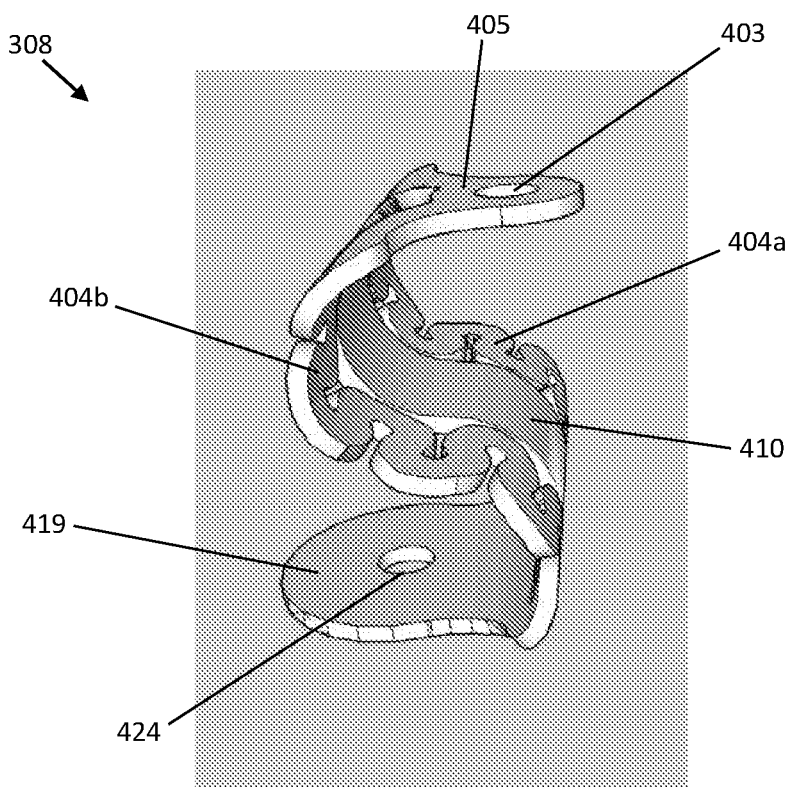
FIG. 4A is a perspective view of a shock absorbing portion for an end anchor of the anchoring system shown in FIGS. 3A to 3C.
Figure 4B:
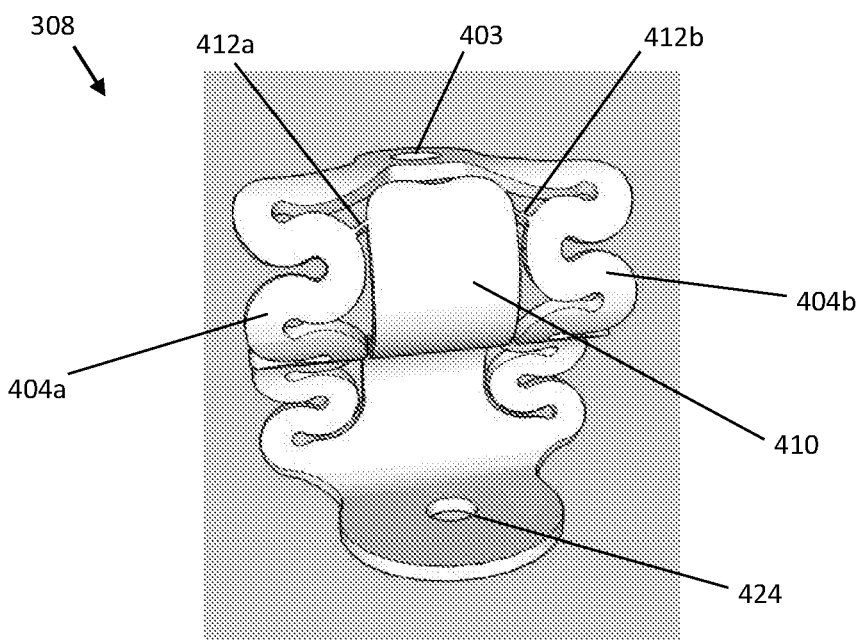
FIG. 4B is a front view of the shock absorbing portion of FIG. 4A.
Figures 4C, 4D:
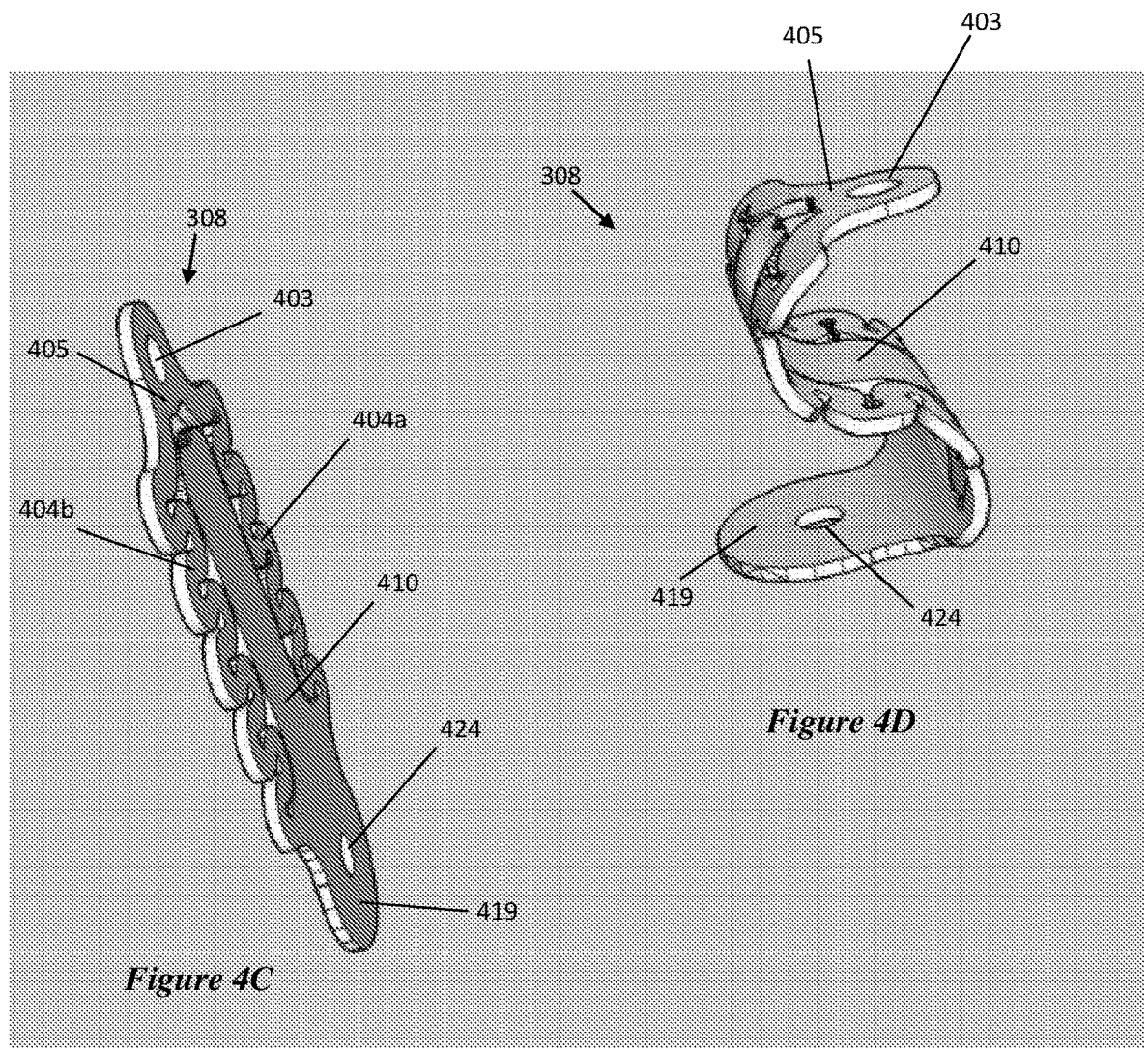
FIGS. 4C and 4D illustrate the shock absorbing portion of FIGS. 4A and 4B before and after forming.

The pair of serpentine shaped members 404a, 404b are connected to a central support member 410 via respective frangible joints 412a, 412b (FIG. 4B). As shown in FIGS. 4A and 4D, when viewed from a side, it can be seen that the shock absorbing portion 308 has a curved profile defining an S-shaped curve.

Figure 4E:
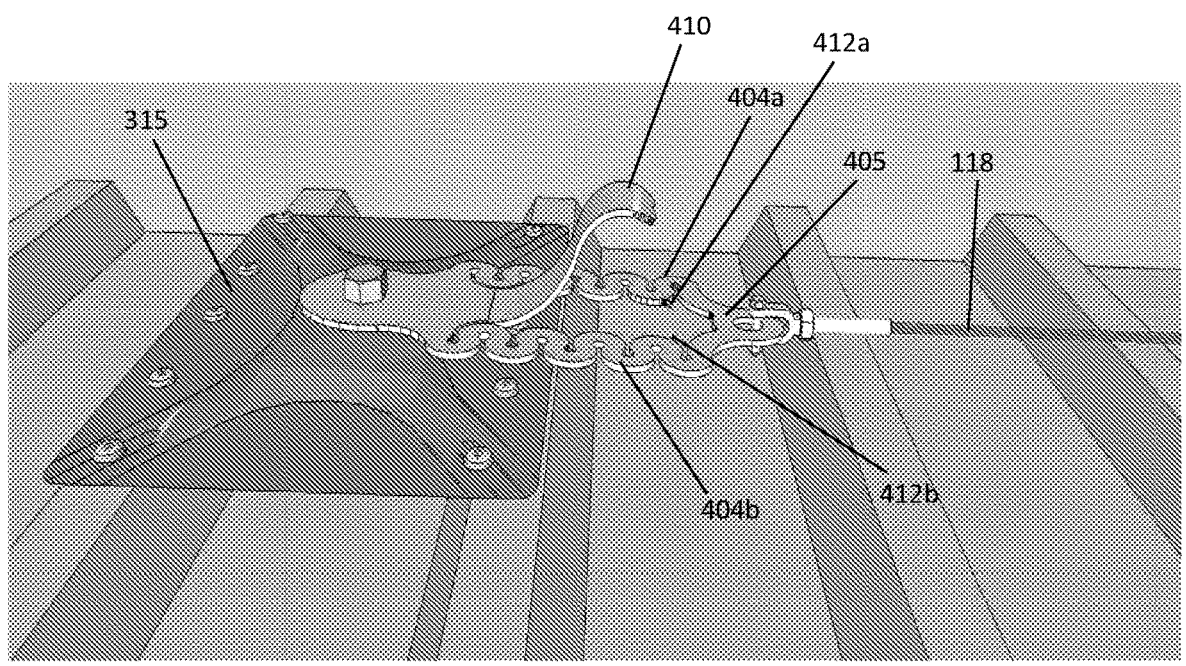
FIG. 4E illustrates a distorted shock absorbing portion of the end anchor of the anchoring system shown in FIGS. 3A to 3C.

Now referring to FIG. 4E, in the event of a fallen worker, a dynamic load is applied to the safety line 118, and transmitted to the shock absorbing portion 308 via the bridging portion 405 which is connected to the safety line 118. If the load exceeds a certain amount, the frangible joints 412a, 412b will break apart, allowing the pair of serpentine members 404a, 404b to break away from the support member 410 and extend in the direction of the load. The curves in the serpentine members 404a, 404b will allow further extension and deformation to absorb any additional energy, for example, in the event of a significant load.

The inventors have found that the combination of the serpentine members 404a, 404b and curved profile of the shock absorbing portion 308 provide the portion 308 with exceptional shock absorbing capabilities. The arrangement of the curves in different planes allow the portion 308 to more effectively absorb the sudden load from any direction.

The frangible joints 412a, 412b provide a degree of support for the serpentine members 404a, 404b and the overall shock absorbing portion 308. The joints 412a, 412b have been designed to break when the portion 308 is subject to a predetermined load.

Therefore, in the event of the application of a sudden load, an initial portion of energy is dissipated by the breaking of the joints 412a, 412b. Further energy is dissipated by extension and/or deformation of the shock absorbing portion 308 from the curve of the S-shaped profile. Finally, extension and deformation of the serpentine members 404a, 404b can facilitate yet further dissipation of energy if required.

The progressive stages in which energy can be absorbed and dissipated by the shock absorbing portion 308 effectively prevents serious injury to the worker in the event of a sudden fall. In other words, the progressive deformation of the portion 308 reduces the effects of the forces acting on a fallen worker.

The configuration of the shock absorbing portion also prevents forces from a sudden load to be concentrated at a single point of an anchor, such as in conventional anchor designs, which can undesirably cause sudden failure at the single point of the anchor without warning.

It will be appreciated that in the event of a fall, the direction the load is applied does not matter. The anchor 304 will still function effectively with the serpentine shaped members 404a, 404b on either side of the central support portion 410 sharing a greater or lesser degree of the load and suitably deforming depending on the direction of the load.

The frangible joints 412a, 412b prevent the serpentine members 404a, 404b from deforming too early or unnecessarily. A further advantage of the frangible joints 412a, 412b is that broken joints indicates a fall has taken place and the relevant anchor(s) 304 requires replacement.

Providing each anchor 302, 306, 100, 304 in the system 300 to with inherent shock absorbing capabilities improves the overall performance and shock absorbing abilities of the system 300, when compared to conventional static line systems in which a single shock absorbing unit is typically mounted to an end anchor.

Figure 5A:
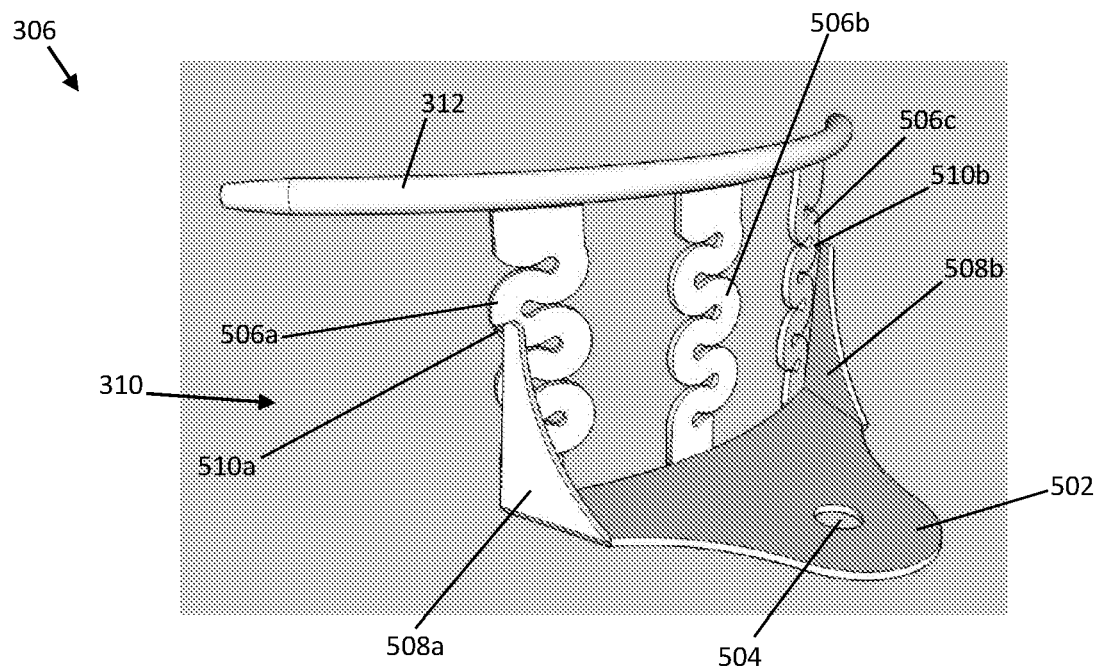
FIGS. 5A and 5B are perspective views of a corner anchor of the anchoring system as shown in FIGS. 3A and 3B.
Figure 5B:
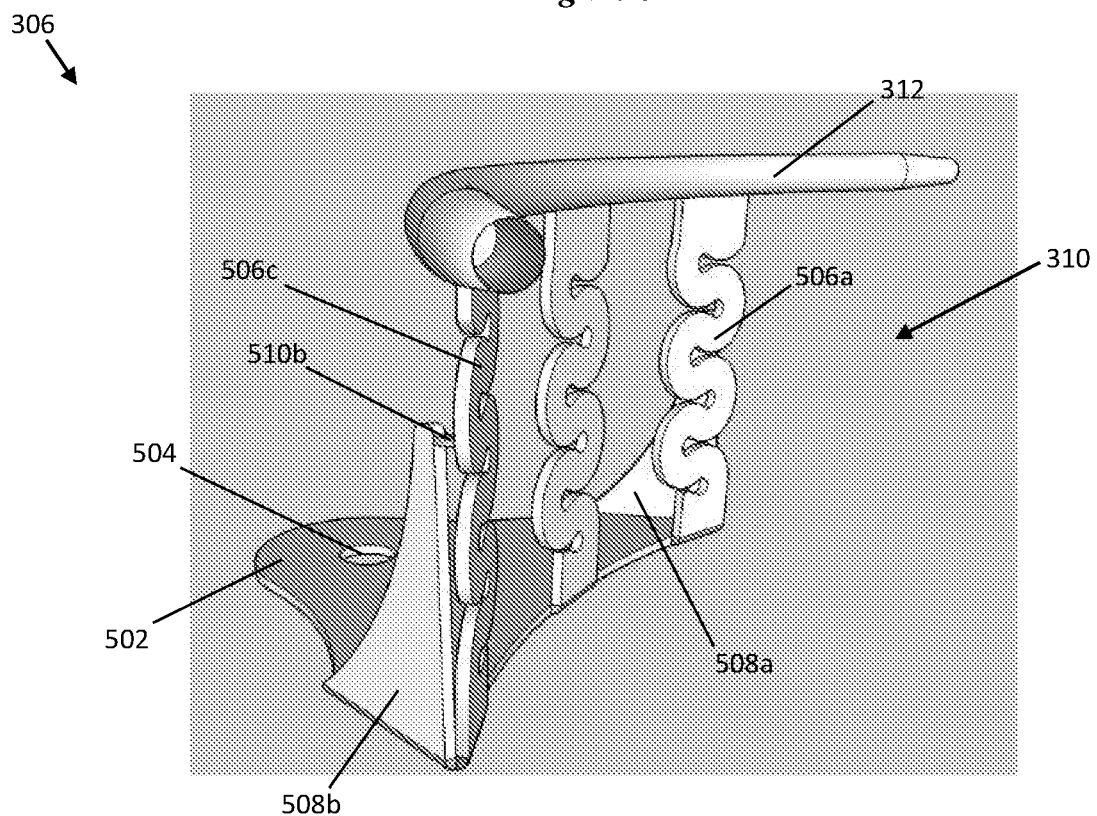

FIGS. 5A and 5B illustrate the corner anchor 306 of the anchoring system 300. The corner anchor 306 includes a shock absorbing portion 310, a base 502 defining an opening 504 for attachment to a mounting plate (not shown) for mounting to the roof, and a curved sleeve 312 for receiving a curved corner portion of the safety line 118.

The three serpentine shaped members 506a, 506b, 506c extend upward from the base 502 along a curved edge of the base 502. When viewed from above, the shock absorbing portion 310 has a curved profile defining a C-shaped curve.

The shock absorbing portion 310 includes a pair of support braces 508a, 508b extending upwardly from opposite sides of the base 502. The two outer serpentine shaped members 506a, 506c are each attached to a respective support brace 508a, 508b via a respective frangible joint 510a, 510b.

In the embodiment shown in FIGS. 5A and 5B, the serpentine shaped members 506a, 506b, 506c are directly attached to the line mount sleeve 312.

Figure 6:
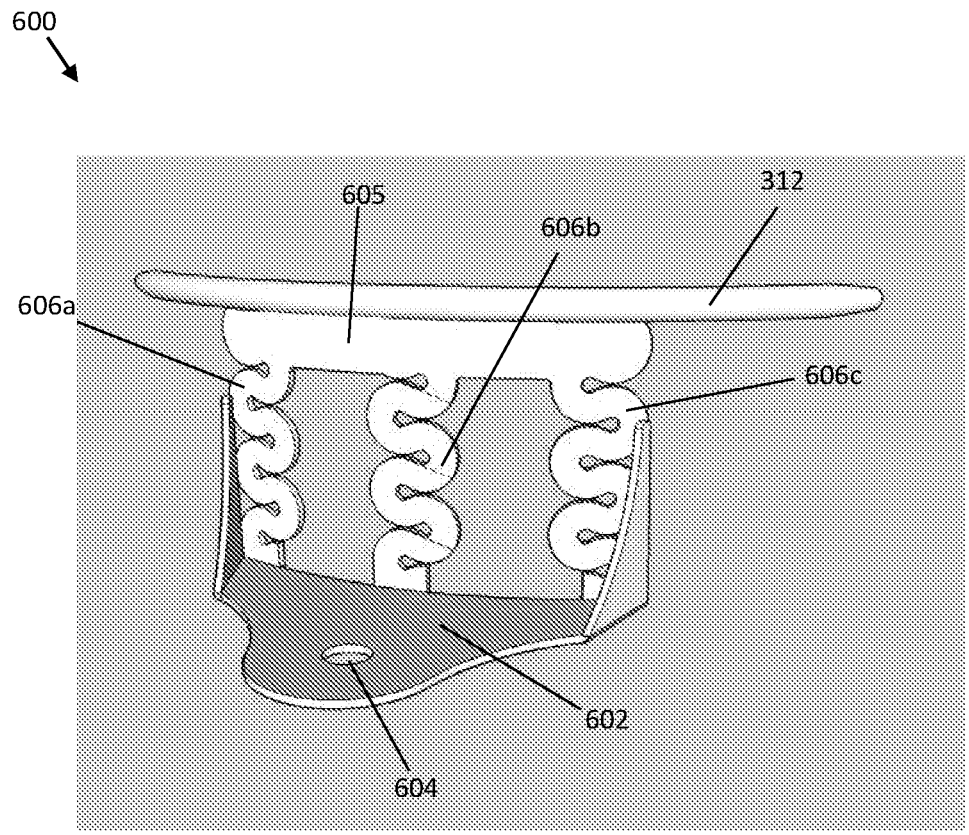
FIG. 6 illustrates an alternative embodiment of the corner anchor.

In an alternative embodiment of a corner anchor 600 as shown in FIG. 6, the serpentine shaped members 606a, 606b, 606c terminate at a bridging portion 605. The bridging portion 605 connects the serpentine members 606a, 606b, 606c to one another and to the line mount sleeve 312. The bridging portion 605 serves to further strengthen the anchor 600 by increasing the connection surface area between the shock absorbing portion 605 and the sleeve 312 through which a sudden load from the safety line 118 is transmitted. The bridging portion 605 also facilitates the absorption and distribution of energy from a sudden load. It will be appreciated that any one or more of the anchors described herein can be configured with or without a bridging portion.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly m references, but also other components, steps or features not specifically listed, unless the contrary is expressly stated or the context requires otherwise.

The invention claimed is:

1. An anchor for anchoring to an elevated worksite, the anchor comprising:
   a shock absorbing portion configured to progressively distort under sudden loading and comprising:
      one or more serpentine shaped members having a front surface and a side surface perpendicular to the front surface, each front surface defining, in an unloaded state of the shock absorbing portion, one or more serpentine shaped curves visible from the front surface of the one or more serpentine shaped members of the shock absorbing portion, and
      a curved profile defined by the side surface of the one or more serpentine shaped members, the curved profile, in the unloaded state of the shock absorbing portion, defining either a generally S-shaped or a generally C-shaped curve that is visible from the side surface of the one or more serpentine shaped members of the shock absorbing portion,
   wherein:
      the curved profile of the serpentine shaped members is configured to extend under sudden loading in a direction of the sudden loading so as to provide a first level of shock absorption in dissipating energy from the sudden loading, and
      when the sudden loading exceeds a certain amount, the serpentine shaped curves are configured to further extend in the direction of the sudden loading to provide a second level of shock absorption in further dissipating energy from the sudden loading.

2. The anchor according to claim 1, wherein the shock absorbing portion further comprises:
   one or more support members for supporting the serpentine shaped members, and
   one or more frangible joints for connecting the one or more serpentine shaped members to the one or more support members,
   wherein the one or more frangible joints are configured to break under sudden loading so as to provide a third level of shock absorption.

3. The anchor according to claim 1, further comprising a line mount for receiving a safety line to which a worker may be tethered.

4. An anchoring system for anchoring to an elevated worksite, the anchoring system comprising:
   at least two anchors, and
   a safety line for connecting the at least two anchors,
   wherein:
      each anchor comprises a shock absorbing portion configured to progressively distort under sudden loading, each shock absorbing portion having one or more serpentine shaped members having a front surface and a side surface perpendicular to the front surface, each front surface defining, in an unloaded state of the shock absorbing portion, one or more serpentine shaped curves visible from the front surface of the one or more serpentine shaped members of the shock absorbing portion, each shock absorbing portion further having a curved profile defined by the side surface of the one or more serpentine shaped members, the curved profile, in the unloaded state of the shock absorbing portion, defining either a generally S-shaped or a generally C-shaped curve that is visible from the side surface of the one or more serpentine shaped members of the shock absorbing portion, the curved profile of the serpentine shaped members is configured to extend under sudden loading in a direction of the sudden loading so as to provide a first level of shock absorption in dissipating energy from the sudden loading, and when the sudden loading exceeds a certain amount, the serpentine shaped curves are configured to further extend in the direction of the sudden loading to provide a second level of shock absorption in further dissipating energy from the sudden loading.

5. The anchoring system according to claim 4, wherein the at least two anchors comprises an end anchor for receiving an end portion of the safety line and an intermediate anchor for receiving an intermediate portion of the safety line.

6. The anchoring system of claim 5, wherein the each of the end anchor and intermediate anchor comprises a shock absorbing portion having a pair of serpentine members, the pair of serpentine members being attached to a central support tongue via one or more frangible joints.

7. The anchoring system according to claim 5, further comprising a corner anchor for receiving a corner portion of the safety line.

8. The anchoring system of claim 7, wherein the corner anchor comprises a shock absorbing portion having three serpentine members, two of the serpentine members each being attached to a lateral support member of the shock absorbing portion via one or more frangible joints.

9. The anchoring system of claim 8, wherein each of the two serpentine members of the intermediate anchor is attached to a lateral support member of the intermediate anchor via a single frangible joint.

10. The anchoring system according to claim 4, wherein each anchor has a sleeve for receiving a respective portion of the safety line.

11. The anchoring system according to claim 4, further comprising a shuttle for connecting to and moving along the safety line, such that a worker may be tethered to the safety line via the shuttle.

12. A shock absorber configured to progressively distort under sudden loading, the shock absorber comprising:

one or more serpentine shaped members having a front surface and a side surface perpendicular to the front surface, each front surface defining, in an unloaded state of the shock absorber, one or more serpentine shaped curves visible from the front surface of the one or more serpentine shaped members of the shock absorber, and a curved profile defined by the side surface of the one or more serpentine shaped members, the curved profile, in the unloaded state of the shock absorbing portion, defining either a generally S-shaped or a generally C-shaped curve that is visible from the side surface of the one or more serpentine shaped members of the shock absorber, wherein:

the curved profile of the serpentine shaped members is configured to extend under sudden loading in a direction of the sudden loading so as to provide a first level of shock absorption in dissipating energy from the sudden loading, and when the sudden loading exceeds a certain amount, the serpentine shaped curves are configured to further extend in the direction of the sudden loading to provide a second level of shock absorption in further dissipating energy from the sudden loading.

* * * * *